United States Patent Office 3,385,694
Patented May 28, 1968

3,385,694
METHOD OF PRODUCING IRON POWDER FROM PIG IRON OR SUCH AND IRON OXIDES
Erik Anders Åke Josefsson, Erik Axel Bengtsson, and Sven Hjalmar Backström, Borlange, Sweden, assignors to Stora Kopparbergs Bergslags Aktiebolag, Falun, Sweden, a Swedish company
No Drawing. Filed Dec. 9, 1964, Ser. No. 418,385
11 Claims. (Cl. 75—.5)

ABSTRACT OF THE DISCLOSURE

This invention relates to a method of producing iron powder of a predetermined grain size distribution from carbon-rich iron in which the finely divided carbon-rich iron is roasted at high temperature with an oxide to reduce the carbon content of the iron to not less than 0.1%, cooling the iron and disintegrating the partially decarbonized iron without reducing its particle size to substantially less than the particle size of the carbon-rich iron and then further decarbonizing at a lower roasting temperature to produce iron powder which is suitable for use in powder metallurgy.

---

The invention refers to the production of iron powder especially such powder suitable for powder metallurgical purposes, and it refers especially to the production of iron powder with low carbon and oxygen contents from pig iron or other iron alloy with high carbon content and oxidic iron materials such as iron ore concentrates by a solid state refining.

It is earlier known that finely divided pig iron can be transformed into an iron low in carbon without melting by so called dry decarbonization of iron oxide material, such as ore. It is also known in the art that iron powder can be produced from granulated iron material containing, for instance, 3-4% C and 5-7% O by heating to about 1100° C. in the $CO/CO_2$ atmosphere which is generated by the decarbonizing reaction started during the heating. Through a recently published process (U.S. Patent No. 3,073,695) for the production of iron powder suitable, for instance, for sinter pressing of articles, it is possible to achieve especially low contents of carbon ad oxygen, and to avoid sintering during the production of the powder as a result of too long a heat treatment, by passing hydrogen gas above the material, especially at the end phase of the decarbonization. The hydrogen gas may be obtained by treating the resulting $CO/CO_2$ gas with water vapor, and washing the thus resulting raw hydrogen gas free from $CO_2$ in an alkaline solution.

When carrying out in practice the powder production in known manner, the raw materials are ground to a grain size suitable for reaction in solid phase, and as a rule to a grain size distribution suitable for powder metallurgical application. During the subsequent treatment which, because of the desirability of high reaction speed and complete reaction, is carried out at high temperature, about 1000° C., and higher, it is, however, difficult to avoid sintering together of the decarbonized powder, especially of its fine grained constituents, and therefore, as a rule, regrinding must be carried out. Thereby, the iron powder grains are subjected to mechanical working, which may influence their hardness and also give the grains a flat shape. Furthermore, it is difficult during the grinding to achieve the desired grain size distribution. All this is detrimental to the powder metallurgical treatment and to the compressibility of the powder (defined as the density of a test piece pressed according to a certain standard procedure).

The invention has for its object to provide a method economically to produce iron powder with low contents of carbon, for instance below 0.05%, and oxygen, for instance below about 0.20%, preferably about or less than 0.15%, and with good compressibility, requiring an adequate grain size distribution and a content of grains with substantially equal extension in the three perpendicular dimensions, freedom from hardening (through cold working) and suitable surface properties. A further object is to obtain a comparatively short treatment time, and also comparatively low treatment temperature, whereby a good economy is obtained. Here and in the following, oxygen content is referred to as that oxygen content which is obtained by determination of "hydrogen loss" according to ASTM.

Grain size distributions, grain size analyses, which may with advantage be used for the purpose of the invention, may be comprised within the following limits:

| Mesh (Tyler): | Percent |
|---|---|
| Above 100 | 0–10 |
| 100–200 | 15–65 |
| 200–325 | 15–45 |
| Below 325 | 5–40 |

Here, as well as in the following, percent refers to weight percent, if not otherwise stated.

According to the invention, these objects are obtained by decarburization in two steps of a mixture of powder of pig iron or other iron alloy with comparatively high carbon content and an iron oxide material, the first step at comparatively high temperature (suitably below about 1000° C.) and limited decarburization in order firstly to make sure of bringing down the oxygen content to a minimum and secondly to make possible a disintegration of the powder, that may have become agglomerated by the treatment, so as to restore the original grain size distribution, and the second step, carried out after disintegration, at comparatively low temperature (below 800° C.) and with a controlled supply of oxygen, in order, without causing sintering or appreciable permanent increase of the oxygen content, to achieve the desired reduction of the carbon content and to remove any cold working hardening that may have taken place at the disintegration (by recrystallization).

The process can thus be carried out in the following manner. One starts with a mixture of pig iron or other iron material (alloy) rich in carbon and iron oxidic material (for instance iron ore concentrate, roll scale) in a grain size distribution suitable for the object. The carbon rich iron material, as well as the iron oxide material in the form of iron ore concentrate or the like, may be ground to such a distribution of grain sizes that the grain size distribution of the material mixture will be essentially the same as the one desired and predetermined in the final iron powder. The iron oxide material, which is relatively easy to grind, should be ground to an essentially finer grain size than the carbon rich iron material in order to obtain the desired low oxygen content and in order to obtain more easily a sufficient portion of fine grains.

The material mixture is heated at a temperature of about 800–1000° C. during a period of time which, depending on the type of furnace, temperature, thickness of the powder layer in the furnace, the character of the oxide material, etc., may be between three and eight hours, and in such proportions that the carbon content will be at least about 0.10%, preferably at least about 0.15%, and suitably not more than about 0.50%, while the oxygen content will be at most about 0.30%, suitably at most 0.25%, preferably not more than about 0.20%, an oxygen content of 0.30% giving a final product of low quality for the objects of the invention, while about 0.15% gives a very good material. Hereafter the mixture is cooled, suitably rapidly and under control of the atmosphere, especially its oxygen content, and the cooled powder mixture is subjected to disintegration for the purpose of breaking up possibly sintered powder grains, thereby substantially restoring the grain size distribution to what it was before the heating. This may be achieved by disintegrating the material without grinding it, i.e., breaking it up with implements which move relatively to each other in the material at a distance from each other essentially greater than the largest grain size in the powder mixture. Carbon, even at these low contents, has a surprisingly strong retarding effect on sintering, especially considering that a powder with a carbon content of about 0.05% is strongly sintering. This, in combination with the hardness of the grains, caused by the carbon content and the possibly rapid cooling, makes it possible to achieve by the disintegration approximately the same grain size distribution as in the starting material, without appreciably flattening the grains. The carbon containing raw material should have a low silicon content, preferably less than 0.02% by weight and the oxidic material, particularly iron ore concentrate, should be low in gangue.

It is essential for the invention that the thus obtained disintegrated powder is subjected to a further decarburizing heat treatment, this time at a temperature below about 800° C., for instance at about 650–775° C., under such conditions that a permanent increase of the oxygen content does not occur, or occurs only to a small extent. For this purpose, the oxygen which is required for the decarburization, must be introduced under such conditions that either is the iron not oxidized at all or the iron oxide formed mainly is consumed again during the decarburization, and a treatment with gaseous reduction agent at the same low temperature that may possibly follow. The end phase of this heat treatment and the subsequent cooling must also take place in a non-oxidizing atmosphere, for instance of argon, hydrogen or possibly carbon monoxide or any mixture thereof, which preferably is at least weakly reducing in relation to iron oxide (FeO), suitably by a content of hydrogen gas. However, especially good results are obtained if the heat treatment is carried out in an atmosphere containing water vapor and hydrogen gas, the ratio of the percentages of which, at least in the final stage, is between 0.5 and 0.07, and possibly a gas inert relative to carbon and iron. At a ratio below 0.5 this atmosphere acts decarburizing without oxidizing the iron. The ratio $H_2O:H_2$ is selected within the mentioned range in relation to the oxygen content of the powder. The decarburization in the second step may, with a certain success, be carried out with easily reducible iron oxide only, which either may be introduced in a finely divided form or be formed in situ by careful oxidation so that only a thin surface layer of easily reducible oxide is formed on the powder particles, the iron oxide preferably being added or formed in a quantity adjusted in relation to the desired lowering of the carbon content. After the decarburization has been completed as described above by annealing at a temperature below 800° C., possibly remaining excess of oxygen is removed by reduction with hydrogen gas.

The disintegration after the first step has also a strongly promoting effect on the final decarburization by breaking up fusion between adjacent grains and exposing new surfaces which facilitates the removal of the carbon to the gas phase at the same time as the loosening of the powder provides shorter diffusion distances for the carbon monoxide containing gases out of the powder mass.

The fact that it is a relatively small amount of carbon which has to be removed—about 0.10% when the carbon content in the first step has been lowered to near the minimum limit 0.15%—means that this second treatment may be of relatively short duration which, in combination with the low treatment temperature, makes the sintering of the powder insignificant, and after cooling facilitates the disintegration of the powder to substantially the same particle size analysis as before the treatment. The cold working which the powder perhaps has undergone at the previously mentioned disintegration, will also be removed by recrystallization during the heat treatment in the second step.

The invention will now be described more in detail with reference to non-limitative examples:

Example 1

A mixture of ground pig iron granules and high-enriched magnetite concentrate in the proportions 81% by weight of granules and 17% by weight of concentrate was treated batchwise in boxes of sheetmetal and of a capacity of 80 kilograms of the mixture in a chamber furnace, the boxes being filled with powder mixture to a height of 35 millimeters. The granules were ground so that 80% passed through a sieve of 0.15 millimeter mesh opening and contained 4.14% by weight of carbon and 0.005% by weight of silicon. The content concentrate was ground to a grain size less than 0.075 millimeter. The percentage of silica in the concentrates was 0.06% by weight.

In the first step the mixture was heated in the furnace at a furnace temperature of 1040° C. for 6.5 hours. The maximum temperature of the powder mixture had then been about 900° C. The waste gases were exhausted during the experiment through an outlet pipe in the furnace. After the heating the powder was quickly cooled to room temperature while passing a stream of hydrogen over the powder. The obtained partially decarburized, lightly sintered iron powder was disintegrated in a disintegrator apparatus. After this first treatment the powder had a content of carbon of 0.34% by weight and a content of oxygen of 0.08% by weight determined as "hydrogen loss" according to ASTM.

The partially decarburized powder was then subjected to a second treatment in the same kind of boxes and in the same furnace at a temperature of 740° C. for 5 hours, a stream of a gas mixture of hydrogen and steam in a partial pressure ratio of 5:1 being passed through the powder. The amount of hydrogen gas supplied was in this experiment 30 liters per minute. 15 minutes before the powder was taken out from the furnace to be rapidly cooled, the supply of steam was interrupted, and only hydrogen was then passed through the powder to the end of the cooling.

During this finishing treatment the powder had only to a small extent sintered together lightly and could easily be disintegrated in a mildly working disintegrator apparatus. After screening off the powder portion of a grain size larger than 0.15 millimeter a powder of the following properties was obtained, percentages being by weight:

Content of carbon _____percent__ 0.02
Content of oxygen (hydrogen loss,
 ASTM) _____do____ 0.13
Screening analysis, mm.:
 0.149–0.104 _____do____ 38.1
 0.104–0.074 _____do____ 27.9
 0.074–0.053 _____do____ 22.8
 Less than 0.053 _____do____ 11.2
Bulk density _____g./cm.$^3$ (ASTM)__ 2.44
Flow rate _____sec. (ASTM)__ 33.0
Density at pressing to, tons/cm.$^2$:
 4 _____g./cm.$^2$ (ASTM)__ 6.50
 6 _____g./cm.$^2$ (ASTM)__ 7.02

Example 2

A mixture of ground pig iron granules and magnetite concentrate, both of properties equal to those of Example 1, but in this case in the proportions 81.3 and 18.7 was charged to a box of sheet metal in quantity of 45 kilograms of powder at a powder layer thicknes of 70 millimeters. The powder mixture was heated in the above mentioned chamber furnace at a furnace temperature of 1040° C. for one hour. The funrace temperature was then lowered during 1.5 hours to 950° C. and was kept at this temperature for further 2.5 hours. The powder mixture then reached a maximum temperature of 870° C. During the following 4 hours the furnace cooled down to 780° C., while 50 liters per hour of argon was passed over the mixture. The powder mixture was then allowed to cool below a heat insulated hood in the closed hydrogen atmosphere at a super atmospheric pressure of 200 millimeters concentrated sulphuric acid.

The decarburized powder was disintegrated as in Example 1 and had after this first treating step an analysis of 0.14% by weight of carbon and 0.17% by weight of oxygen ("hydrogen loss").

In a second step the obtained iron powder was treated in a box of the same size as in the first step at a furnace temperature of 720° C., hydrogen gas (180 l./h.) being first passed over the powder for 1 hour and a mixture of hydrogen and steam in a partial pressure ratio of 5:1 (180 l. hydrogen per hour) being then passed over the powder for further 4 hours. The treatment was closed with cooling of the powder in about 45 minutes to room temperature while passing hydrogen gas over the powder (180 liters per hour).

After a mild disintegration all powder coarser than 0.15 millimeter was separated.

The powder obtained had the following properties, percentages being by weight:

Content of carbon _____percent__ 0.02
Conent of oxygen (hydrogen loss,
  ASTM) _____do____ 0.24
Screening analysis, mm.:
  0.149–0.104 _____do____ 33.6
  0.104–0.074 _____do____ 30.2
  0.074–0.053 _____do____ 21.1
  Less than 0.053 _____do____ 15.1
Bulk density _____g./cm.$^3$ (ASTM)__ 2.49
Flow rate _____sec. (ASTM)__ 32.0
Density at pressing to, tons/cm.$^2$:
  4 _____g./cm.$^2$ (ASTM)__ 6.48
  6 _____g./cm.$^2$ (ASTM)__ 7.00

What we claim is:

1. A method of producing an iron powder low in carbon and oxygen comprising heating at between about 800° C. and about 1000° C. an intimate mixture of particles of iron oxide and iron rich in carbon to partially decarbonze said iron and provide a slightly sintered iron having a carbon content of between about 0.10% and 0.50%, cooling the slightly sintered iron, disintegrating said slightly sintered iron to a pulverulent state and heating the pulverulent iron to a temperature between about 650° C. and about 800° C. in the presence of an oxidizing agent to further decarbonize the iron and produce iron powder and removing excess oxygen from said powder.

2. The method set forth in claim 1 wherein the proportion of oxygen in said intimate mixture of oxide and carbon-rich iron provides said partially sintered iron with an oxygen content not exceeding 0.30%.

3. A method according to claim 1 wherein said carbon-rich iron has a grain size distribution substantially the same as the grain size distribution of said iron powder.

4. A method according to claim 3 wherein said partially sintered iron is disintegrated to a grain size not substantially smaller than a predetermined grain size of said particles in said mixture.

5. A method according to claim 1 wherein said partially sintered iron is cooled rapidly prior to disintegrating it.

6. A method according to claim 1 wherein said oxidizng agent is finely divided iron oxide.

7. A method according to claim 1 in which the step of heating the pulverulent iron at a temperature between 650° C. and 800° C. is conducted in the presence of water vapor.

8. A method according to claim 7 comprising completing heating of the partially decarbonized iron at a temperature of 650° C. to 800° C. to produce iron powder and cooling the iron powder in non-oxidizing atmosphere of at least one gas of the class consisting of argon, hydrogen, carbon monoxide diluted with an inert gas, moist hydrogen gas with a ratio of $H_2O:H_2$ of not more than about 0.5.

9. A method according to claim 1 wherein the proportion of oxygen in said intimate mixture of oxide and carbon-rich iron provides a partially sintered iron having an oxygen content not exceeding about 0.25%.

10. A method according to claim 1 wherein the proportion of oxygen in said intimate mixture of oxide and carbon-rich iron provides a partially sintered iron having an oxygen content not exceeding about 0.20%.

11. A method according to claim 1 in which the step of heating said pulverulent iron at a temperature between 650° C. and 800° C. is conducted in the presence of moist hydrogen gas.

References Cited

UNITED STATES PATENTS

| | | | |
|---|---|---|---|
| 2,438,584 | 3/1948 | Stewart | 75—34 |
| 3,073,695 | 1/1963 | Silbereisen et al. | 75—.55 |

DAVID L. RECK, *Primary Examiner.*

HYLAND BIZOT, *Examiner.*

W. W. STALLARD, *Assistant Examiner.*